(No Model.)
H. POOLE.
CORN OR CANE HARVESTER.
No. 498,693. Patented May 30, 1893.
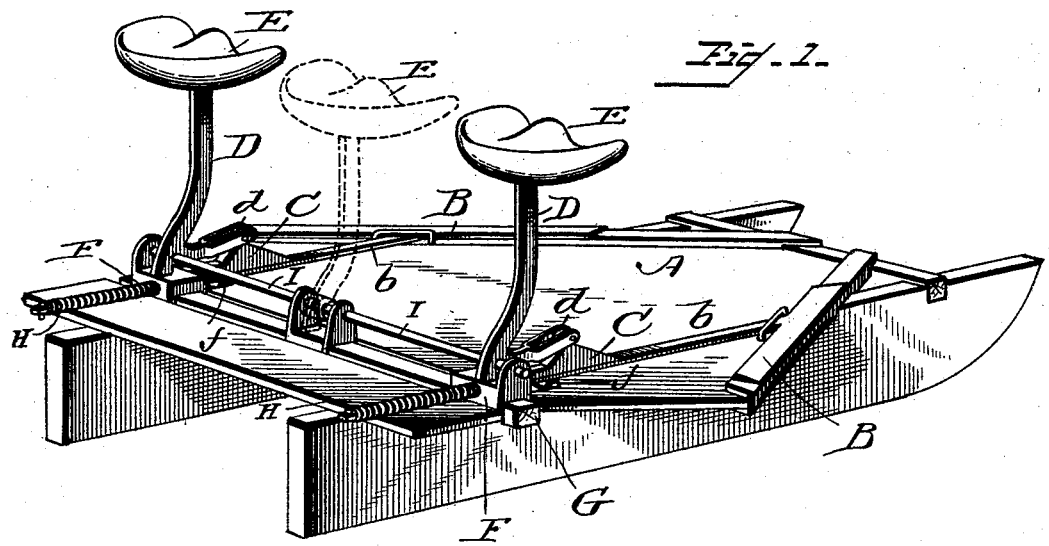
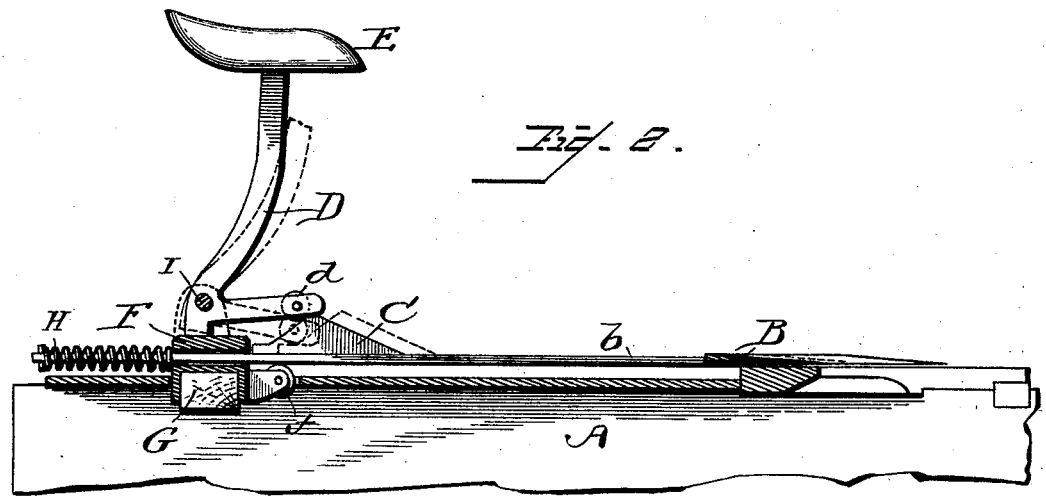
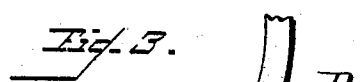
Witnesses
Inventor
Henry Poole,
By his Attorneys

UNITED STATES PATENT OFFICE.

HENRY POOLE, OF CANTON, KANSAS.

CORN OR CANE HARVESTER.

SPECIFICATION forming part of Letters Patent No. 498,693, dated May 30, 1893.

Application filed April 23, 1892. Serial No. 430,377. (No model.)

*To all whom it may concern:*

Be it known that I, HENRY POOLE, a citizen of the United States, residing at Canton, in the county of McPherson and State of Kansas, have invented certain new and useful Improvements in Corn or Cane Harvesters; and I do hereby declare the following to be a full, clear, and exact description of the invention, such as will enable others skilled in the art to which it appertains to make and use the same.

This invention relates to corn or cane harvesters.

The object aimed at is to prevent injury to the driver or animal in the event of accident. In these machines as generally constructed the knives project forward from the platform at all times. Hence, should the driver or attendant lose his balance and fall in front of the machine when the latter is in operation, or, should the animal back or take fright and turn, serious injury would result in either instance by the knife coming in contact with the person or with the animal.

The purpose of the present invention is to project the knife or knives into an operative position by the weight of the driver or attendant and have the knives retracted automatically should the driver or attendant be unseated or move from a position necessary to hold the knife or knives projected.

The improvement consists, essentially, of a knife or knives which are adapted to be projected beyond the front edge of the platform or be withdrawn within the said edge, a lever under the control of the driver or attendant and adapted to actuate the said knife or knives, and a spring to hold the said knife or knives in a retracted position when the lever is not acted on by the driver or attendant.

The improvement further consists of the novel features and the peculiar construction and combination of the parts which will be hereinafter more fully described and claimed and which are shown in the annexed drawings, in which—

Figure 1 is a perspective view of a corn or cane harvester embodying my invention. Fig. 2 is a side elevation showing the operation of the invention by dotted lines, parts being broken away to better show the relative location of the parts. Fig. 3 is a detail view of a modification showing a positive connection between the rod that is fastened to and projected in the rear of the knife and the operating lever.

The machine A for cutting corn or cane may be of any approved form, this not being essential to the present invention.

In the present illustration the harvester is shown provided with two knives and independent operating mechanism, but these are not necessary as one knife may be used, or, the mechanism may be so constructed as to be operated by a single lever to project the two knives. Inasmuch as the knives and the actuating mechanism are duplicated, a detailed description of one will suffice for both.

The knife B is adapted to be projected beyond the front edge of the platform and be withdrawn a half to three quarters of an inch from the said edge, more or less, so as to be out of the way. The rod $b$ extended in the rear of the knife passes through suitable guides, and is provided on its upper side with cam C. The lever D is elbow shaped and its horizontal member is provided with an anti-friction roller $d$ which is adapted to travel on the said cam C when operating the lever to project the knife. The said horizontal member is bifurcated and the roller $d$ is journaled between the separated portions. The vertical portion of said lever preferably forms the seat standard, the seat E being secured to the upper end thereof. The driver or attendant may lean against the lever D to project the knife into an operative position, but it is preferred to provide the seat so that the weight of the driver or attendant in a sitting position may effect the desired result. The lever D is pivoted to a vertical extension of a plate F which is mounted on a cross bar G and which is provided with depending lugs to embrace the sides of the said cross bar. The anti-friction roller $f$ journaled between ears projected forward from the plate F, supports the rod $b$ against the downward pressure of the roller $d$ on the cam C when the lever D is acted on to project the knife. The spring H mounted on the rear portion of the rod $b$ is held between a stop near the rear end of said rod and the plate F. When the knife is projected the spring H is compressed and when the lever D is free the spring H withdraws and holds the knife in a retracted position.

Where two knives are provided as shown, independent levers may be provided to operate each, especially, if two attendants accompany the machine; but should only one attendant be provided, the two levers may be readily coupled in any desired or well known manner to operate together, or a third lever may be provided and coupled or otherwise secured to the inner ends of the rods I to which the levers D are secured, as shown by dotted lines in Fig. 1. The lever D is limited in its backward motion by having its lower end constructed to engage with the plate F.

In the construction shown in Figs. 1 and 2 the lever D only actuates the knife positively in one direction. In Fig. 3 a construction is shown in which the lever D actuates the knife positively in each direction. The cam C is provided with an oblique slot J in which works the roller $d$. A spring K is provided to act directly on lever D to return the same to a normal position after being operated to project the knife, for the purpose of withdrawing the knife.

It will be observed that the front or inclined edge of the platform forms in effect a guard for the knife, protecting the same when the said knife is withdrawn or in a retracted position, as shown in Fig. 1. The lever D operated on by a spring constitutes a tilting frame or yielding support to actuate the knife or knives to project the same into an active position when under the influence of the driver or attendant, and withdraw the said knife or knives behind the edge of the platform or guard when the influence of the said driver or attendant is removed. Any suitable and equivalent means of the spring H may be employed to counterbalance the said lever D or its equivalent tilting frame or support.

Having thus described my invention, what I claim, and desire to secure by Letters Patent, is—

1. In a corn or cane harvester, the combination of a knife constructed to be readily projected into and withdrawn from an operative position, a lever for actuating the said knife and a spring for normally holding the knife in a retracted position, substantially as described.

2. In a corn or cane harvester, the combination of a knife constructed to be readily projected into and withdrawn from an operative position, a rod extended in the rear of the said knife and provided with a cam, an elbow lever having its horizontal member constructed to engage with the said cam, and a spring for holding the knife in a retracted position, substantially as described.

3. In a corn or cane harvester, the combination of a knife constructed to be readily projected into and withdrawn from an operative position, a rod extended in the rear of the said knife and provided with a cam, an elbow lever having its horizontal member constructed to engage with the said cam, a spring to normally hold the knife in a retracted position, and an anti friction roller located beneath the said rod opposite the said cam, substantially as and for the purpose described.

4. In a corn or cane harvester the combination of a knife constructed to be readily projected into and withdrawn from an operative position, a rod extended in the rear of the said knife and provided with a cam, an elbow lever having its horizontal member constructed to engage with the said cam, and a spring located on the rear portion of the said rod and adapted to normally hold the knife in a retracted position, substantially as set forth.

5. In a corn or cane harvester, the combination of a knife constructed to be readily projected into and withdrawn from an operative position, a lever for actuating the said knife and provided with a seat to support the weight of the driver, and a spring for withdrawing the knife from an operative position, substantially as described.

6. In a corn or cane cutter, the combination with a frame, of a movable knife with a guard therefor, and a counter weighted tilting frame operatively connected with the knives, whereby the tilting of the said counterweighted frame acts to withdraw the knife behind the guard, substantially as and for the purpose described.

7. In a corn or cane cutter, the combination with its frame, of a knife and its guard, a yielding support for the rider and mechanism attached to said support whereby said knife is adapted to be uncovered by the weight of a rider, and to be automatically covered when the weight is removed, substantially as set forth.

In testimony whereof I affix my signature in presence of two witnesses.

HENRY POOLE.

Witnesses:
  D. C. WYMAN,
  JOHN LEDBETTER.